United States Patent
Ziskind et al.

(10) Patent No.: US 8,155,669 B2
(45) Date of Patent: Apr. 10, 2012

(54) METHODS FOR RECEIVING AND RESPONDING TO LOCATION-BASED DATA

(75) Inventors: Jonathan Scott Ziskind, Santa Barbara, CA (US); Alan Edward Field, Los Angeles, CA (US); Russell Edward Ziskind, Baldwinsville, NY (US)

(73) Assignee: ZOS Communications, LLC, Santa Barbara, CA (US)

( * ) Notice: Subject to any disclaimer, the term of this patent is extended or adjusted under 35 U.S.C. 154(b) by 750 days.

(21) Appl. No.: 12/245,641

(22) Filed: Oct. 3, 2008

(65) Prior Publication Data

US 2009/0093260 A1    Apr. 9, 2009

Related U.S. Application Data

(60) Provisional application No. 60/997,669, filed on Oct. 4, 2007, provisional application No. 61/189,681, filed on Aug. 21, 2008.

(51) Int. Cl.
*H04W 4/02* (2009.01)

(52) U.S. Cl. ............... 455/456.3; 455/412.2; 455/456.1; 455/466

(58) Field of Classification Search ............... 455/456.1, 455/456.2, 456.3, 458, 466, 574, 9, 412.1, 455/412.2, 413, 414.1, 457, 566
See application file for complete search history.

(56) References Cited

U.S. PATENT DOCUMENTS

| | | | |
|---|---|---|---|
| 7,236,775 | B2 | 6/2007 | Chun et al. |
| 7,269,426 | B2 * | 9/2007 | Kokkonen et al. .......... 455/456.2 |
| 7,751,356 | B2 * | 7/2010 | Kim et al. ..................... 370/311 |
| 7,917,183 | B2 * | 3/2011 | Ryu et al. ...................... 455/574 |
| 2003/0182052 | A1 | 9/2003 | DeLorme et al. |
| 2004/0068364 | A1 | 4/2004 | Zhao et al. |
| 2005/0033511 | A1 | 2/2005 | Pechatnikov et al. |
| 2005/0080555 | A1 | 4/2005 | Parupudi et al. |
| 2005/0083909 | A1 * | 4/2005 | Kuusinen et al. ............. 370/352 |
| 2006/0256008 | A1 * | 11/2006 | Rosenberg .................... 342/367 |
| 2007/0038362 | A1 | 2/2007 | Gueziec et al. |
| 2007/0149214 | A1 | 6/2007 | Walsh et al. |
| 2007/0270164 | A1 * | 11/2007 | Maier et al. ................ 455/456.2 |
| 2008/0119174 | A1 * | 5/2008 | Farkas et al. ............... 455/414.1 |
| 2008/0301580 | A1 * | 12/2008 | Hjelmeland Alams et al. ............................ 715/808 |

* cited by examiner

*Primary Examiner* — Cong Tran
(74) *Attorney, Agent, or Firm* — SilverSky Group, LLC

(57) ABSTRACT

A location-based messaging system and its methods of operation are disclosed, including methods for receiving and responding to location-based data. Methods for sending geographic location information for a target address from a computing device to a receiving device that will enable the receiving device to display a map and/or directions from a geographic location of the receiving device to the geographic location of the target address, methods for processing and distributing location-based data, and methods for virally distributing location-based applications are also disclosed.

46 Claims, 8 Drawing Sheets

METHODS FOR RECEIVING AND RESPONDING TO LOCATION-BASED DATA

CROSS-REFERENCES TO RELATED APPLICATIONS

This is a utility patent application, taking priority from provisional patent application Ser. No. 60/997,669, filed Oct. 4, 2007; provisional patent application Ser. No. 61/189,681, filed Aug. 21, 2008; and international application Ser. No. PCT/US2008/078853, filed Oct. 3, 2008, which applications are incorporated herein by reference.

BRIEF DESCRIPTION OF THE INVENTION

The present invention is directed to location based services, and more particularly to a location-based message system and its methods of operation, such as methods for receiving and responding to location-based data. Methods for sending geographic location information for a target address from a computing device to a receiving device that will enable the receiving device to display a map and/or directions from a geographic location of the receiving device to the geographic location of the target address, methods for processing and distributing location-based data, and methods for virally distributing location-based applications are also described.

STATEMENT AS TO THE RIGHTS TO INVENTIONS MADE UNDER FEDERALLY SPONSORED RESEARCH OR DEVELOPMENT

Not Applicable.

REFERENCE TO A "SEQUENCE LISTING," A TABLE, OR A COMPUTER PROGRAM LISTING APPENDIX SUBMITTED ON A COMPACT DISK

Not Applicable.

BACKGROUND OF THE INVENTION

Wireless communication providers offer a number of global information service (GIS) and location based service (LBS) applications. For example, VERIZON offers the VZNAVIGATOR navigation system and AT&T and SPRINT offer the TELENAV navigation system for mobile devices, such as smart phones by SONY, NOKIA and MOTOROLA. Both of these navigation systems use global positioning satellite (GPS) data to tell users where they are, to locate nearby places of interest, and to provide them with directions to desired locations. By navigating through a large number of different menu choices and screens, a user can find a location and get directions in two ways: (1) selecting a location from a list of pre-identified locations (either by name or within categories); or (2) entering a valid address into appropriate fields on a screen to receive directions or a map to the desired address. A pre-identified location is one that the wireless communication provider or navigation system provider has previously selected and entered necessary data so as to enable the user to be provided with directions or a map to that location without having to enter the address.

The process of entering an address can be simplified through the use of a voice command system that allows the user to speak certain commands to their mobile device to get it to accept an address, and then speaking the address out loud to the device in order to get it to provide directions. Adding voice recognition functionality to a mobile device increases the cost of that device and does not necessarily improve its functionality. Despite significant improvements in recent years, voice recognition systems remain highly unreliable, so users can readily enter incorrect address information. Further, if a user is attempting to enter an address for some place they want to go, they must have the address with them first so they can speak it. This requires the user to either memorize the address, which can be difficult, or to write the address down. If they are driving or walking at the time, this might be impossible or quite dangerous. By the time a user has written the address down, and then spoken the address to their mobile device, the benefits of voice recognition will not have been realized.

A number of so-called "geosocial networking" companies, such as LOOPT and WHRRL, offer geolocation services that enable users within the same network to find one another. Geolocation generally refers to the association of a geographic location to an Internet connected device, such as a mobile device. If two mobile devices each have a geolocation, the corresponding geographic locations of those devices can be shown on the map, thereby enabling the users of the devices to find each other. Geosocial networking companies take advantage of this feature to enable users of their social networking software and services to find each other. However, this feature is only available to users of the same social network who happen to be on each other's so-called "friends" or "buddy" lists. To expand this type of service to a larger group of people would be difficult because each map would include so many people that it would be difficult to discern one user from another. The service also only works well within a limited geographic region, such as a portion of a large metropolitan city. Accordingly, this type of service has not been expanded to other out-of-network applications.

DETAILED DESCRIPTION OF THE INVENTION

The present invention is directed to systems and methods for sending first geographic location information from a computing device to a receiving device that will enable the receiving device to display a map and/or directions from a geographic location of the receiving device to the first geographic location. The first geographic location can correspond to the sending device or any other geographically locatable position. The receiving device can be a smart phone type device that is GPS-enabled (or utilizes other location aware services)

and has access to mapping software, or a simpler mobile phone that is capable of receiving directions and/or a map to the first geographic location.

Figure 1:
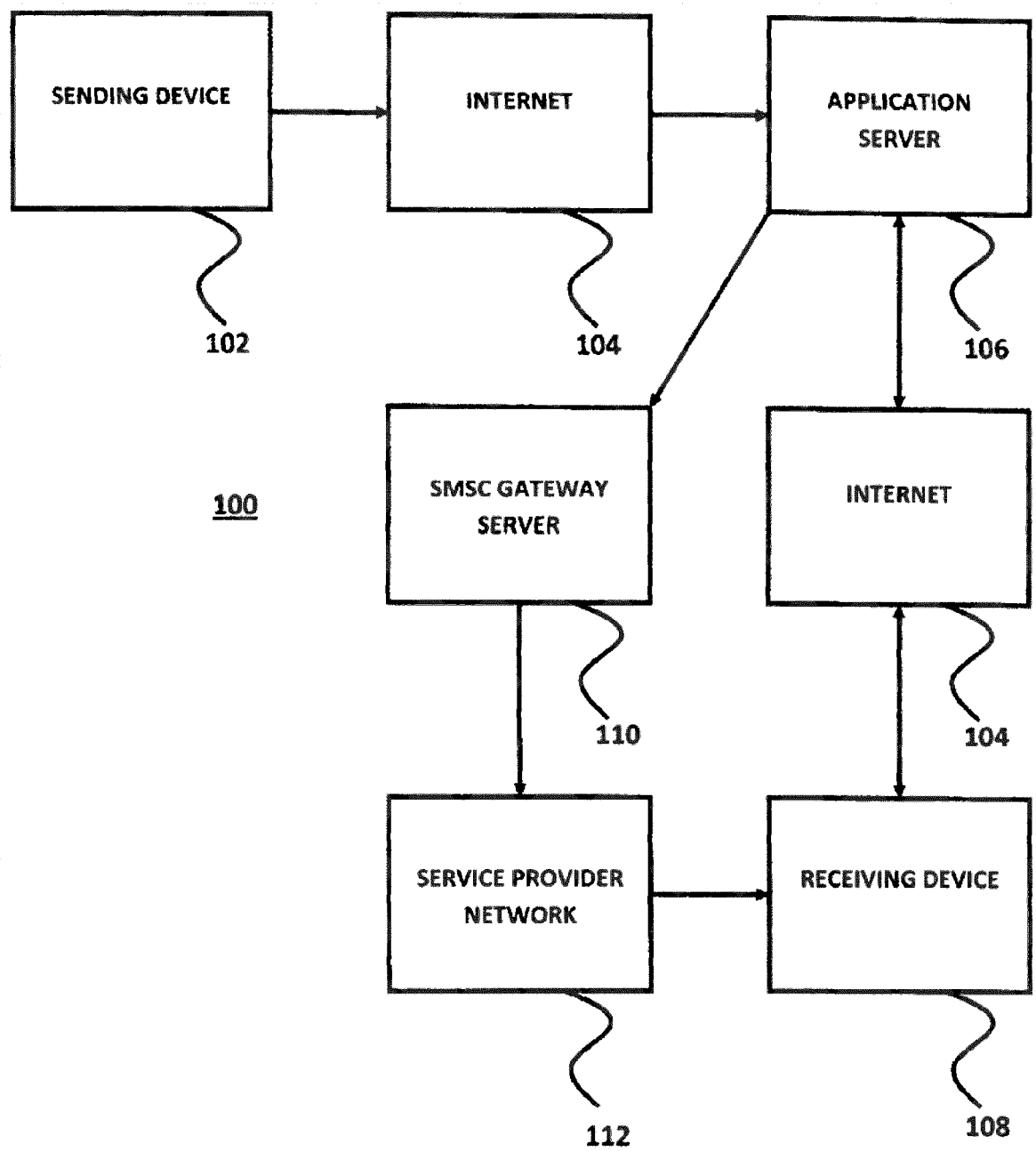
FIG. 1 is a block diagram illustrating an exemplary system architecture for use with the present invention.

FIG. 1 illustrates a high level system architecture of the overall system 100 of the present invention, in which a sending device 102, such as a computer or a mobile device (i.e. smart phone, mobile phone or other computerized communication device), sends a location request, i.e., a data message utilizing a HyperText Transfer Protocol (HTTP) connection, through the Internet 104 to the application server 106, which then communicates location information to the receiving device 108. A location request is herein referred to as a ZHIING™ request. (ZHIING is a trademark of the applicant of the present invention). This ZHIING request can be generated in a number of ways. One, the sender can open an appropriate software application on the sending device that allows the sender to highlight (then click on a browser applet further described below) or open a window or dialogue box in which the user can type in the target address and send it to the receiving device 108 through the application server 106. Two, the sender can select an icon (corresponding to the target address and installed by a browser plug-in further described below) within a web page displayed on the sending device, which causes the aforementioned software application to open and enable the sender to send the location request.

A third way of sending a ZHIING request from a mobile device to another mobile device is also described below. Hence, the ZHIING request includes at least the target address and a phone number corresponding to the receiving device, but could include additional information as well. For example, the ZHIING request could include the user's Internet Protocol (IP) address and the Uniform Resource Locator (URL) for the web page from which the ZHIING request is being generated, as well as a title or subject for the request, some form of identification of the sender, and a note or message.

Upon receipt of the location request, the application server 106 will determine whether the receiving device (based on its unique identifier, such as a phone number, IP address, or some other form of identification) has previously received and responded to a ZHIING message. A ZHIING message is a certain type of message sent from the application server 106 to the receiving device 108. If the receiving device has previously received and responded to a ZHIING message, then the receiving device will have the ZHIING manager software already installed and will be ready to respond to the next ZHIING message. Since the application server keeps track of all of the receiving devices (based on their unique identifiers) that have installed the ZHIING manager, it will know, before sending a ZHIING message to a receiving device, whether the receiving device represents a prior user or a new user.

Depending on the nature of the receiving device, if the ZHIING manager has already been installed, the application server may send a Short Message Service (SMS) message to the receiving device 108 through the Short Message Service Center (SMSC) gateway server 110 (directly if possible, or through the service provider network 112 providing communication services to the receiving device 108 if necessary). The SMS message causes the ZHIING manager to turn on and communicate directly with the application server. If the ZHIING manager has not been installed, the application server 106 will send an SMS message to the receiving device (through the gateway server 110) that provides a link for downloading the ZHIING manager to the receiving device. The content of SMS messages are described in greater detail below.

Although the preferred embodiment of the present invention utilizes SMS text messaging as the transport mechanism for ZHIING messages (because the majority of mobile phones are SMS-enabled), many other transport mechanisms could be utilized, such as Multimedia Messaging Service (MMS) and electronic mail. Communication between the application server and the receiving device could also be enabled through the use of IP addresses and/or URLs, by taking advantage of other data transfer protocols available over the Internet.

As noted above, certain types of receiving devices 108 might enable different communication modes or require different forms of data to be exchanged, so the diagram of FIG. 1 and the description set forth above are merely intended to be exemplary and are not inclusive of all of the different forms of communication that might be possible with a receiving device 108 in order to send a ZHIING request or to enable a ZHIING message. For example, if the receiving device 108 is GPS-enabled and has access to mapping software, it would not be necessary to send direction or mapping information directly to the receiving device to enable it to identify, to the user, the target street location or target location. Rather, the receiving device 108 would be able to pull the necessary information from a server providing such data via its mapping software, as further described below.

However, even if the receiving device is not GPS-enabled, it may still be able to receive a ZHIING message and provide the user with directions, by, for example, having the application server 106 communicate directly with the receiving device 108 to provide it with a map and/or text-based directions. Other forms of location aware services that could be used by the receiving device include General Packet Radio Service (GPRS), triangulation, and Wi-Fi-based services. And, even if the mobile device does not have any location aware service available, a user could be "prompted" to respond to a ZHIING message with their current location so the user could be supplied with a route map and/or directions from their current location to a target location.

Finally, the sending and receiving devices do not need to be mobile phones. Any type of wireless or wired communication device could utilize the present invention, although the utility of doing so will depend on the device. For example, while it might be possible to send a ZHIING message to a desktop computer, it would not be possible to pick the desktop computer up and follow the map or directions that are provided. However, it could be possible to print that map or directions. Like, certain navigation devices could benefit from the present invention, where specific direction to a target address could be sent directly to the device, thereby saving the user from having to enter the target address into the device in order to get directions. Utilization of the present invention in emergency responder vehicles could reduce by minutes the amount of time it requires such a vehicle to get to a target address, thereby saving lives.

The systems and methods of the present invention involve a number of different components that enable ZHIING requests and ZHIING messages to be sent and received in a number of ways. For example, as briefly described above, there are two methods for sending a ZHIING request utilizing the browser of a sending device 102 connected to the Internet 104: an applet and a browser plug-in. An applet is a software component that runs in the context of another program, such as a web browser, and that performs a relatively narrow function that has no independent use. A plug-in, or similar type of extension, is a software program that interacts with a host application, such as a web browser, to provide a certain specific function. Although applets and plug-ins in accordance with the present invention can be created and installed to operate with any browser, only the FIREFOX browser developed by Mozilla Foundation is used herein to describe the features of the applet and plug-in. Use of the FIREFOX browser to describe features of the present invention is exemplary only and should not be construed to limit the present invention to just the particular description contained herein. Furthermore, both the applet and the plug-in are described in the context of their installation on a computer because the functionality of browser software on smaller mobile devices, such as mobile phones is too limited at the present time to support the functions of applets and plug-ins. However, it is assumed that mobile phones and browser technology will continue to evolve and the applet and plug-in of the present invention, and similar software, will become fully functional over time.

Figure 2:
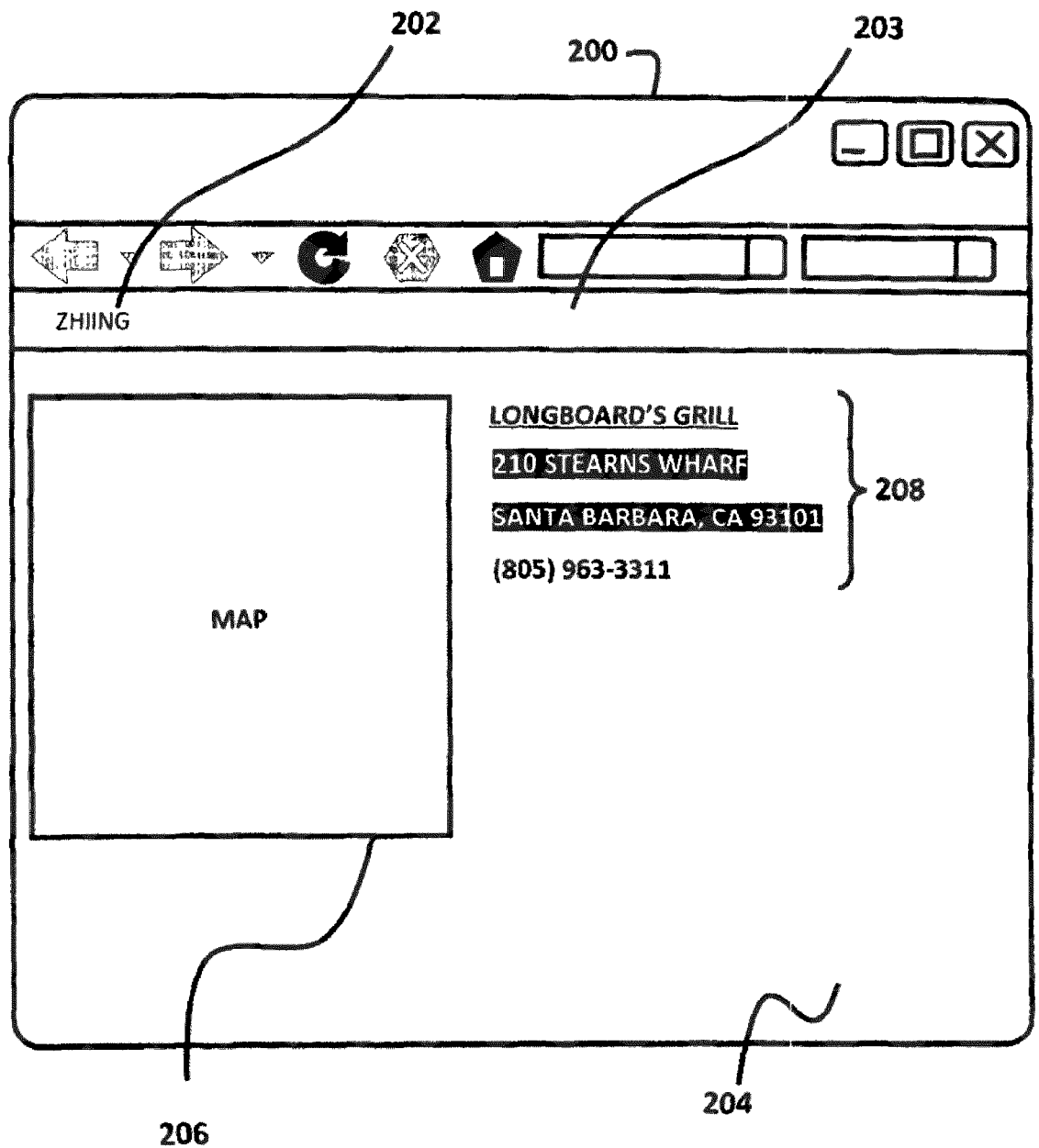
FIG. 2 illustrates a web page incorporating a browser applet in accordance with the present invention.

As illustrated in FIG. 2, the applet is installed on the sending device 102 to run in the context of the browser also so installed. When the browser opens a window 200, a button or menu selection 202 is shown within the toolbar 203 of the browser window 200 to enable the user of the sending device 102 to access the functionality of the applet. The selection 202 could optionally be provided as a link in a bookmark bar as further noted below. The functionality of the applet enables the user to highlight any lines of text representing an address (essentially pieces of text) that appears on a web page 204 (in this case a search result that generates a map 206 and the name, address and phone number 208 of a restaurant, with the address portion highlighted), and then click on the ZHIING button selection 202 to bring up the ZHIING dialogue box or window 300.

Figure 3:
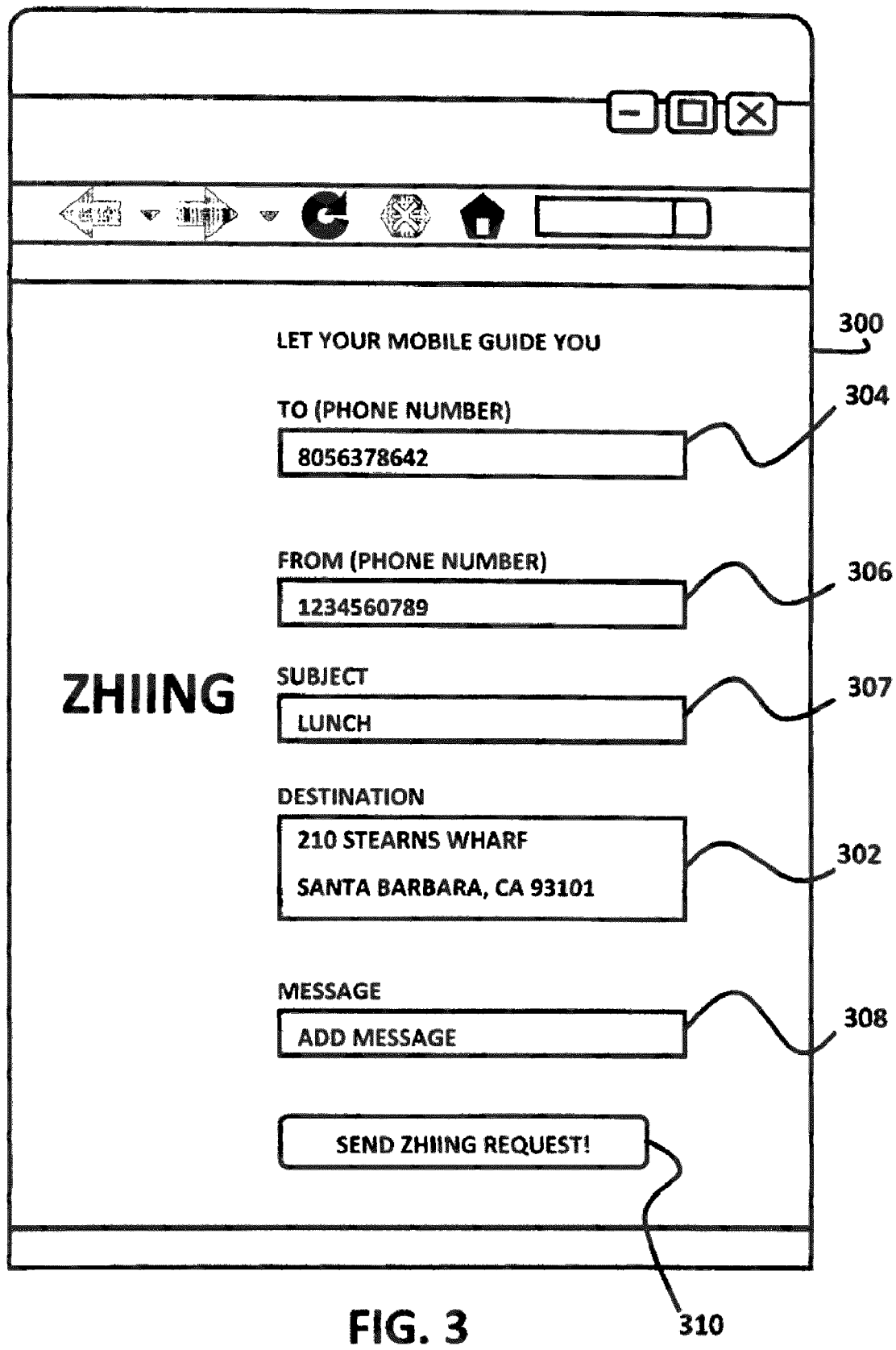
FIG. 3 illustrates a dialog box for use with a browser applet and browser plug-in in accordance with the present invention.

As illustrated in FIG. 3, if the address 208 highlighted on the web page 204 is a valid address, the applet will copy the lines of text from the web page corresponding to the valid address and the window or dialogue box 300 will open with the destination or target address portion 302 already pasted or filled-in. If the address 208 is not valid, i.e., missing some aspect of a complete address, then the dialogue box 300 might open, but require the user to manually fill in the target address within an address field within the window 300. Alternatively, if the highlighted text 208 is not a valid address, the dialogue box 300 might not open so as to let the user know that the highlighted address is not valid. Naturally, other scenarios are possible.

The user would then fill in the phone number 304 for the receiving device 108 (to which the ZHIING request is being sent), the sender's identification (such as a name, phone number, or some other form of identifying text that would be appropriate for a "FROM" field) 306 (if the sender desires to provide one), and optional subject text 307 and message text 308 that the sender would like to send with the ZHIING request. Once the dialogue box 300 has been filled in, the user would send the ZHIING request by selecting the "Send ZHIING Request!" button 310, thereby causing the request to be sent to the application server 106.

In order to install the applet for use in association with a user's browser, the FIREFOX browser enables the user to simply drag a hyperlink (or link) corresponding to the applet into the bookmark area of the browser. Hence, a user could be sent an email that includes the applet link, or receive a ZHIING message from another party that includes the link, or obtain the link in many other ways. Once the link has been dragged and dropped into the browser, it will appear as a link in the bookmark bar.

The plug-in operates in a manner very similar to the applet except that the plug-in automatically places a ZHIING icon next to any valid address that appears on a web page being viewed by a browser that includes the plug-in. The ZHIING icon might be a brand logo or some other symbol that readily identifies itself. When the user clicks on a ZHIING icon, the dialogue box 300 is opened, the plug-in captures the address associated with the icon, and the corresponding destination/target address filed pre-filled in with the captured data. If the sending device has the ability to know the sender's unique identifier (whether the sender is using a computer, navigation device, mobile phone or other device), that unique identifier may also be pre-filled in, or a drop down menu could be provided that includes a list of previously used identifiers/phone numbers, if any. Likewise, if the user has previously used the dialogue box 300, the box 306 might include a drop down menu that includes a list of previously used receiving device identifiers/phone numbers.

Figure 4:
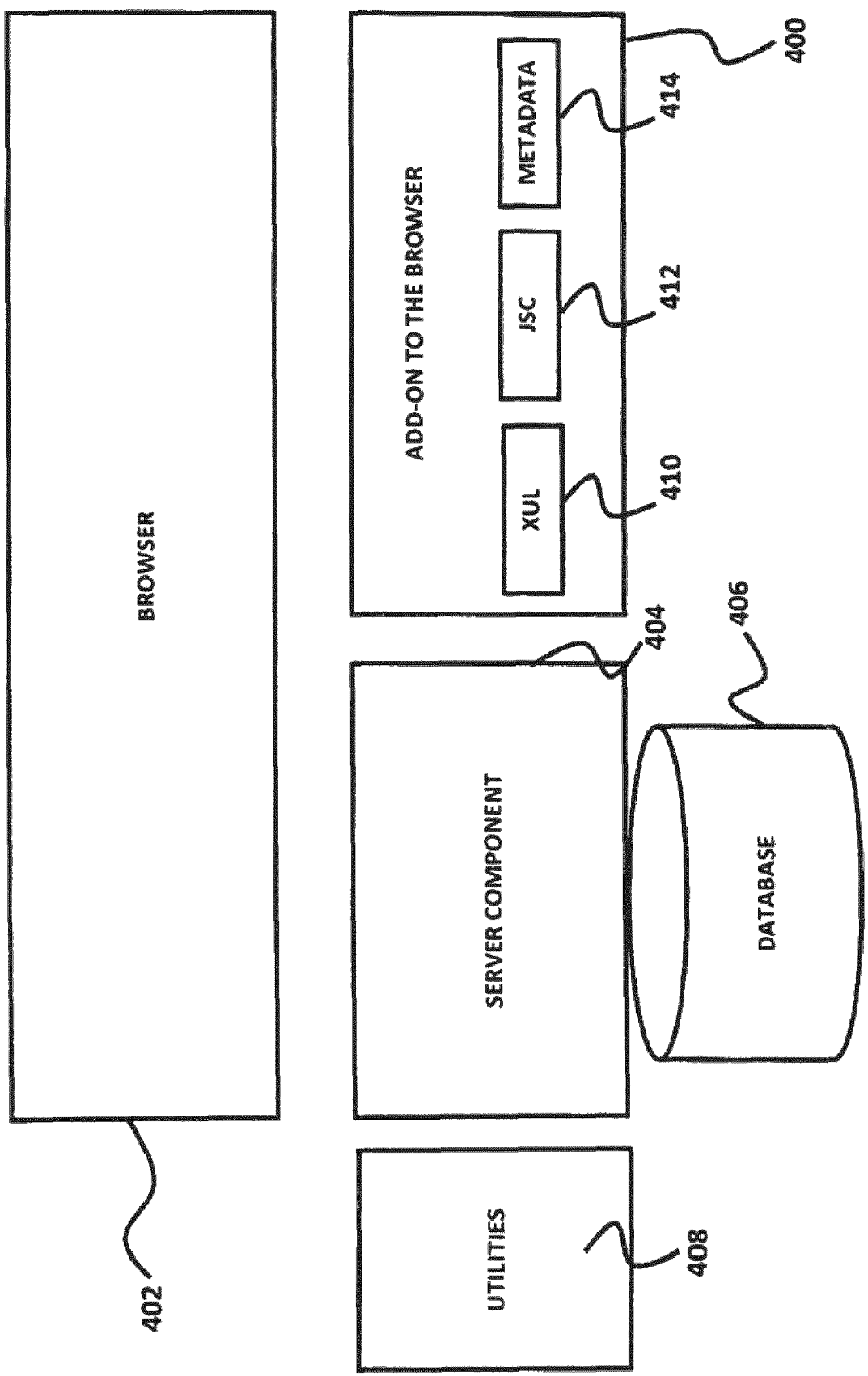
FIG. 4 illustrates a high level architecture of the browser plug-in referenced in FIG. 3.

To more fully understand the operation of the browser plug-in or add-on software, reference is now made to FIG. 4, which depicts an exemplary version of the add-on software 400 and its various component modules. The add-on software 400 would be installed by accessing a link on a web site or other message (as noted above) to the executable code that installs the software. Since the add-on software interacts with the browser 402 and takes advantage of its user interface and shares resources with the browser, a reduced amount of code is required to enable the software 400 to operate in a variety of different computing environments. While different browsers operate in different ways, requiring different add-on software 400 to be required to operate with each different browser, the software described in reference to FIG. 4 does provide an overall understanding of the operation of all such software in the context of the present invention.

As illustrated in FIG. 4, the add-on software 400 uses component modules of the browser 402, such as the server component 404, which is used by the add-on software 400 to interface with the application server 106, the database 406, and the utilities 408, which perform eXtensible Markup Language (XML) Schema Definition (XSD) validation of each ZHIING request. ZHIING requests take the form of a XML document, so there are certain rules (the XSD) that the request must conform to in order to be considered valid. The other major component modules of the software 400 are the XML User Interface Language (XUL) 410, the Java Script Compressor (JSC) 412 and the metadata 414. XUL 410 is a well-known markup language developed by Mozilla for use in its cross-platform applications, such as FIREFOX. XUL 410 is the primary application code for the software 400, which enables it to be integrated with FIREFOX. JSC 412 is JavaScript that can be used for a number of different functions, such as popping up a window, as noted below, and controlling the size, position and attributes of that window, as well as validating data input by the user into the dialogue box 300 before sending that data to the application server 106. The metadata 414 component manages the data input by the user into the dialogue box 300.

Figure 5:
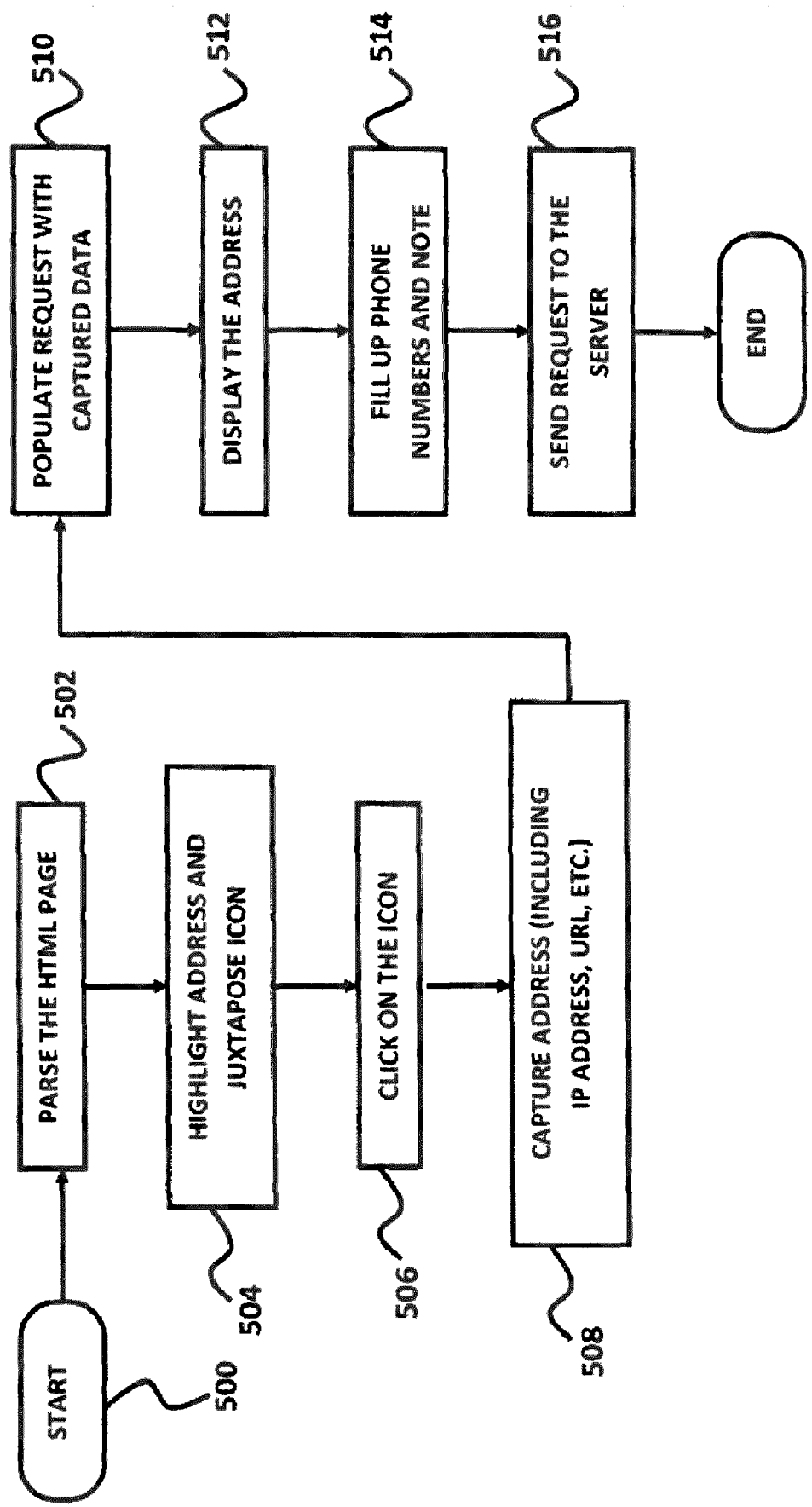
FIG. 5 is a flow diagram illustrating the operation of the browser plug-in of FIG. 4.

From a functional perspective, the add-on software 400 performs the following functions: (1) parsing, (2) extracting and (3) transforming. These functions will be further explained below in the context of the process flow diagram of FIG. 5, but the basic functions are as follows: (1) the parser or parsing function may operate in a number of different ways so as to enable valid addresses to be extracted, such as converting a HTML string from the web page 204 to XML format; (2) the extractor or extracting function then identifies valid addresses from the XML formatted material; and (3) the transformer or transforming function transforms the HyperText Markup Language (HTML) content on the web page 204 corresponding to each extracted address so as to place the ZHIING icon next to each extracted address. The transformer also creates a hyperlink that corresponds to each ZHIING icon that includes the extracted address in the query parameter of the hyperlink.

As noted above, FIG. 5 illustrates the process flow followed by the add-on software 400 when identifying valid addresses within a web page and sending a ZHIING request to the application server 106. A valid address is defined as an address for which a ZHIING request can be sent. For example, when the add-on software 400 is being used in the United States, valid addresses might only include addresses within the United States that include a street name, city name, state name and zip code (or perhaps no zip code would be required). Valid addresses could also be limited in other ways, such as restricting addresses within certain parts of a town (perhaps a violent area), from being available for use in a ZHIING request. The time of day, the day of the week, and even mileage limits from one location to another, could be other forms of limitations on valid addresses.

After the add-on software 400 has been installed and a web page has been opened, the software 400 will start, block 500, by parsing the web page and extracting valid addresses, block 502. If any valid addresses are found, and the limitation restrictions for addresses do not prevent those addresses from being used in a ZHIING request, the addresses are highlighted and the ZHIING icon (hyperlink) is placed next to each corresponding address, block 504. As an alternative to limiting valid addresses during this part of the process, the add-on software 400 could permit all addresses to be identified as complete, and apply limitations at a later point in time, such as after the request has been sent and processed by the application server 106.

If the user of the web page clicks on one of the icons, block 506, the software 400 captures the associated address, including any other information that might be associated with the request, as noted above, such as an IP address of the user, the user's location (if known), the URL of the web page, or other information, block 508. The ZHIING request is then populated with the captured data, block 510, and displayed to the user, block 512, in window/dialogue box 300. After the user has filled in the phone numbers and message, block 514, the ZHIING request is sent to the application server 106. As an additional alternative embodiment, the software 400 could establish a database (perhaps within the storage of the sending device) of previously utilized target addresses, phone numbers of receiving devices, and other information previously entered by the user, or automatically, to make future use of the software 400 easier and/or faster.

The application server 106 will process the ZHIING request and send a ZHIING message to the SMSC gateway server 110, or directly to the receiving device if a different transport mechanism is utilized. If the message is sent to the server 110, it will then send the ZHIING message to the receiving device 108, as further described below. To process the ZHIING request, as further described below, the application server extracts the text representing the target address from the message and geocodes the target address (if not already sent in the form of a geographic location or geocode by the sending device), and posts the request to a database server. Generating a geocode, or geocoding, is the process of finding the geographic coordinates (such as latitude and longitude) associated with other geographic data, such as a street address or a zip code. The database server (which is shown as part of the application server 106 in the present disclosure, but could be a separate device physically connected to the application server 106 or remotely connected to the application server 106 through the Internet 104) records the transaction, performs a SMS routing lookup to determine the best path to the receiving device, and possibly generates targeted marking information to include in the ZHIING message.

The ability to include an advertisement or other information in a ZHIING message is an option. Given the rich information that exists regarding the user (location, interest, possible route, etc.), targeted marking information directed to the users of ZHIING messages could be quite valuable. If targeted marketing is implemented, the database server would determine appropriate content to include with the ZHIING message, much like well known advertising servers operate on the web today, and make sure this content was included in the outgoing ZHIING message by the application server 106.

If the receiving device 108 has never previously received a ZHIING message, as determined by the application server's records (i.e., comparing the unique identification of the receiving device with a database or list of unique identifiers to which messages have previously been sent), the application server 106 will send the receiving device 108 instructions, in the form of a text message or other message, on how to download the ZHIING manager so the receiving device can receive the geocode associated with the present message and also send ZHIING requests in the future. While the text message instructions could be structured in many different ways, one simple preferred method is to ask the user in text if the user is interested in receiving ZHIING messages and then providing the user with a link that could be selected to access a host from which the ZHIING manager application could be downloaded. The user could also be asked to send their current location back to the application server. Regardless of the positive manner in which the user responds, the application server will now have the ability to download the ZHIING manager to the receiving device, which then enables the user to send their own ZHIING requests. Distributing the ZHIING manager in this fashion also creates a viral distribution or load of the ZHIING manager that promotes its rapid acceptance among a large portion of the population of potential users. Every user that receives a ZHIING message and downloads the ZHIING manager, suddenly becomes a potential sender of ZHIING requests, which are highly likely to be sent to other users that have not yet received a ZHIING request, and so on, until the ZHIING manager has been widely distributed.

Once the ZHIING manager has been downloaded on the receiving device 108, it will be able to open a communication channel with the application server to receive location identifiers corresponding to the target address and directions to that target address. As previously noted, the presently preferred underlying transport mechanism for initiating the transfer of data from the application server 106 to the receiving device 108 is text messaging, and in particular SMS messaging, although MMS for some other messaging platform now existing or later developed could be equally utilized. However, the receiving user will not see the ZHIING message as text (except for the first message they receive which instructs them to download the ZHIING manager, and unless restricted by the platform of the receiving device, as is presently the case with the IPHONE). Rather, the ZHIING manager will intercept the text message and process the message to remove the text and process any data contained therein, as further described below.

When the ZHIING manager is being installed on the receiving device 108, it will also check to see if appropriate map libraries have been installed on the receiving device already, and if not, will prompt the user to install them. Appropriate mapping software (such as GOOGLE maps software or BLACKBERRY maps software) and associated libraries vary depending on the receiving device 108. Upon installation, the ZHIING manager will configure the text processing application interface and the mapping application interface, add a quick launch icon for the ZHIING manager on the receiving device's main screen, and send a request to the application server 106 to send any unread ZHIING messages, including the original ZHIING message, so they can be processed by the ZHIING manager.

Also during installation, the ZHIING manager will be configured to be the text message interceptor application. This enables the ZHIING manager to check each incoming text message to determine if it is really a text message or a ZHIING message. ZHIING messages are retained by the ZHIING manager and text messages are sent to a message queue for the text messaging application. ZHIING messages are identified by a unique prompt or code that is included in each message that would never appear in any other text message, under normal circumstances. This intercept function is possible because the operating system of most hand-held devices is configured to pass on messages received by the devices to a specific application that processes such messages. The operating system will post the message to a message queue associated with that application. For example, text messages, such as SMS messages, would typically be posted to the message queue associated with the SMS processing application. To intercept such messages, the ZHIING manager installation procedure reconfigures the receiving device's operating system to post all SMS messages to the message queue associated with the ZHIING manager. The ZHIING manager can then check each message to see if it includes the prompt, and if not, send the text message back to the SMS application for normal processing.

The ZHIING manager can be installed and operated on any of a large number of mobile devices, although each device may require a different implementation in order to account for differences between how the devices operate. Overall, however, the basic functionality of the ZHIING manager is the same regardless of the receiving device on which it was installed. For example, the ZHIING manager should always be able to create and send ZHIING messages, store ZHIING messages that it has sent (an "OUTBOX" or "SENT" folder), receive and store ZHIING messages sent to it (an "INBOX" folder), view messages sent along with a ZHIING message, and generate directions and messages in response to received ZHIING messages. Other features, such as forwarding ZHIING messages or automatically resending ZHIING messages that did not go through on a prior send command, could also be implemented.

As previously noted, once installed, the ZHIING manager is preferably launched upon receipt of a ZHIING message. Certain limitations currently presented by the IPHONE operating system presently prevent the ZHIING manager from being launched upon receipt of a ZHIING message. Rather, once a ZHIING message is received, the user is notified so the user can launch the ZHIING manager. Once the ZHIING manager is invoked, the ZHIING manager downloads all of the ZHIING messages that have been received since the ZHIING manager was last launched (the delta ZHIING messages) and alerts the user about all of the newly received ZHIING messages. At this point, the user has the option of viewing the different ZHIING messages to choose one or more to open or to store.

If the user opens a ZHIING message, appropriate content from that ZHIING message (such as the FROM identification, the SUBJECT, the DESTINATION and any MESSAGE) will be displayed to the user, along with an option to view the route map to the target location. Once the user opts to view the route map, the mapping or navigation application software will be automatically launched on the receiving device 108 to display a route on a map starting at the receiving device's current geographic location and ending at the geographic location of the target location sent in the ZHIING message. As an alternative, the user could be presented with written directions from the starting point to the ending, or in addition to the map, and could be presented with spoken directions, if their receiving device 108 is so enabled.

When a ZHIING message is received, once the ZHIING manager is installed, the ZHIING manager will open a communication channel with the application server to receive data associated with the ZHIING message. This data is not contained within the ZHIING message itself. For example, upon receipt of the ZHIING message, the ZHIING manager would open a channel with the application server over the Internet (including through a voice channel in the case of a mobile phone or GPRS device) and send an HTTP request. The HTTP request lets the application server know that the ZHIING message was received and that the receiving device is ready to receive data. The application server would respond with an HTTP response that provides all of the data, such as the geographical coordinate information for the target location, as well as any sending information, the subject, the message, etc. Once the receiving device has received the data, it will inform the application server and the channel will be closed.

The ZHIING manager will then insert the geographic location information into a coordinate queue, while inserting the other incoming data into the ZHIING manager's application queue. The ZHIING manager maintains a separate queue of geographical coordinate information that corresponds to each ZHIING message. There is a one-to-one mapping between the coordinate queue and the application queue. The coordinate queue is required to segregate the geographical coordinate information from the rest of the information associated with the ZHIING message, which can be presented to the user by the ZHIING manager. As ZHIING messages are received, the user is alerted and presented with the option to view the data associated with each ZHIING message, navigate to the target location, as already described above, or store data associated with the ZHIING message. Although the ZHIING manager is really storing or viewing or forwarding the data associated with a ZHIING message, rather than the message itself, to simplify the present description and the functions described in many of the claims herein, the present invention refers to the message in place of the data when describing and claiming the process of handling the data associated with each ZHIING message. Hence, if the user chooses to store a ZHIING message, the ZHIING manager will retain the data associated with the ZHIING message in the application queue, retain the geographical coordinate information in the coordinate queue, and place the data associated with the ZHIING message in the INBOX as an "unread" message.

Although the ZHIING manager is necessary to receive a ZHIING message, it can also be used to reply to a ZHIING message, perform a reverse ZHIING request, and send a ZHIING request, in a manner similar to the sending device 102. A receiving device replies to a ZHIING message by replying back to the application server with the geocode or geographic location of the receiving device, which is then returned to the sending device in the same manner that a ZHIING message is sent. The user of the receiving device could also reply to any message that might be contained in the original ZHIING message. A reverse ZHIING request involves the sending device requesting the geographic location of the receiving device, instead of sending a target address to the receiving device. Thus, like a reply, the receiving device would determine its geographic location and send that back to the sending device, which could either go to the sending device indirectly through the application server or directly back to the sending device without going through the application server.

Figure 6:
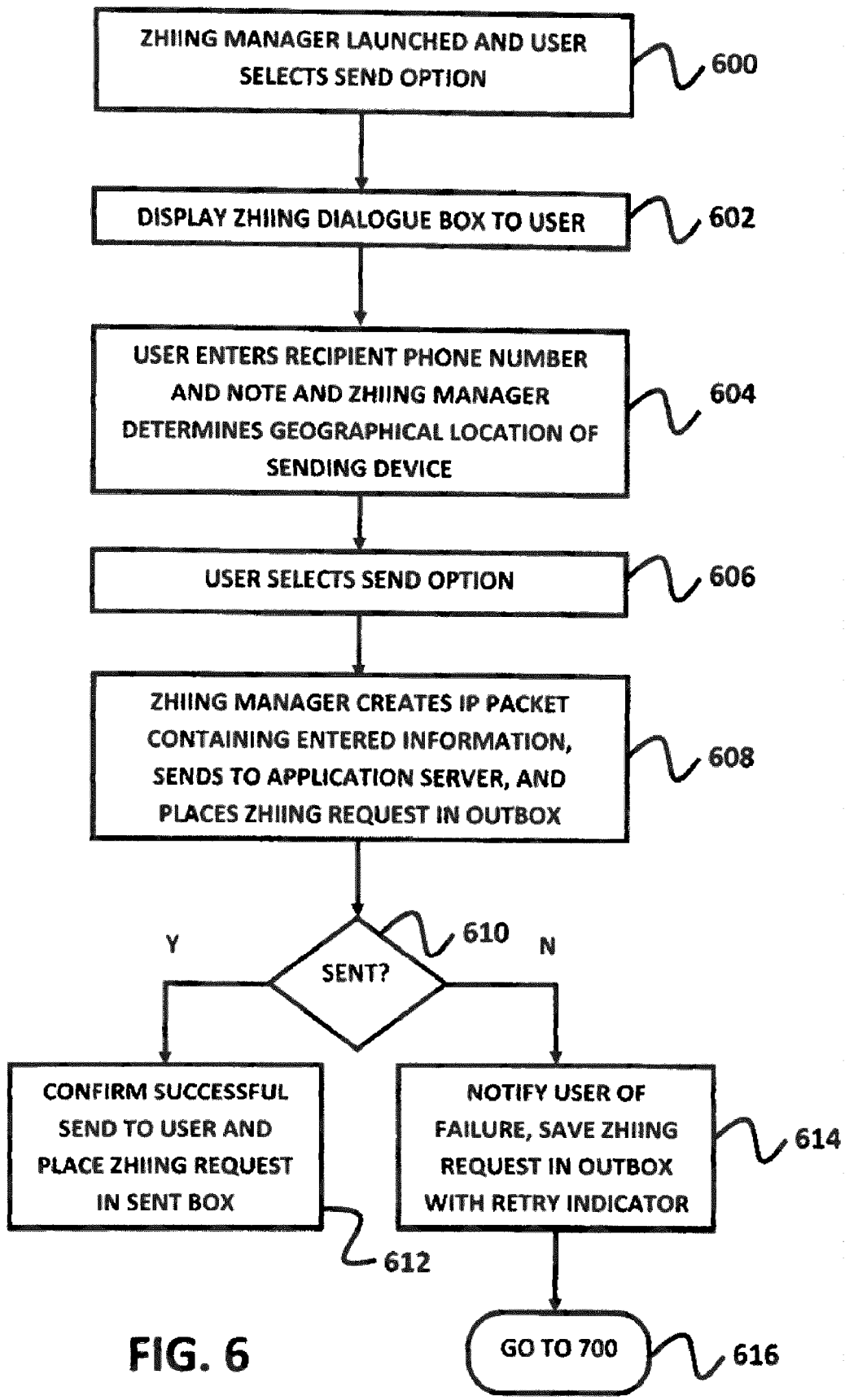
FIG. 6 is a flow diagram illustrating the operation of the ZHIING manager.

FIG. 6 illustrates how the ZHIING manager sends a request. The ZHIING request can take two forms: one essentially identical to using the ZHIING applet, where the user highlights an address within a web page being browsed by the user on the sending device (when mobile device browsers become so capable), or by manually entering an address; and one that uses the geographic location of the sending device in place of an address. Since the first form has already been discussed above, the second form will now be discussed.

To send a ZHIING request including the sender's location (such as when the user wants a friend or someone else to be able to find them), the user would launch the ZHIING manager on the sending device (in this case, a mobile device equipped with a location identification service) and select the option for sending a ZHIING request from the ZHIING manager's user interface, block 600. The ZHIING manager would then open a window or dialogue box on the display of the sending device, like dialogue box 300 (but without the destination box 302, since that will be just the longitude and latitude of the sending device), block 602. As with dialogue box 300, the user would then enter the phone number for the receiving device, or select a phone number from a menu of addresses or from an address book or contact list available on the sending device, while the ZHIING manager determines the geographical location of the sending device for entry into the ZHIING request. Preferably, the sending device's phone number will be automatically filled in, block 604.

Once the dialogue box has been filled in, the user would select the send option, block 606. The ZHIING manager would then create an IP packet or HTTP request containing the ZHIING request and send the ZHIING request to the application server 106. The ZHIING manager would also put a copy of the ZHIING request in the OUTBOX with an indication that the request is being processed, block 608. Since the network accessibility and connectivity of mobile devices varies, the ZHIING manager would check to see if the ZHIING request was successfully sent, block 610. If the ZHIING request was successfully sent, the successful send would be confirmed to the user and the ZHIING request would be moved from the OUTBOX to the SENT box, block 612. If the ZHIING request could not be sent for some reason, the user would be notified and the ZHIING request would be saved in the OUTBOX with a retry indicator, block 614. The ZHIING manager would then move to the retry process, block 616.

Figure 7:
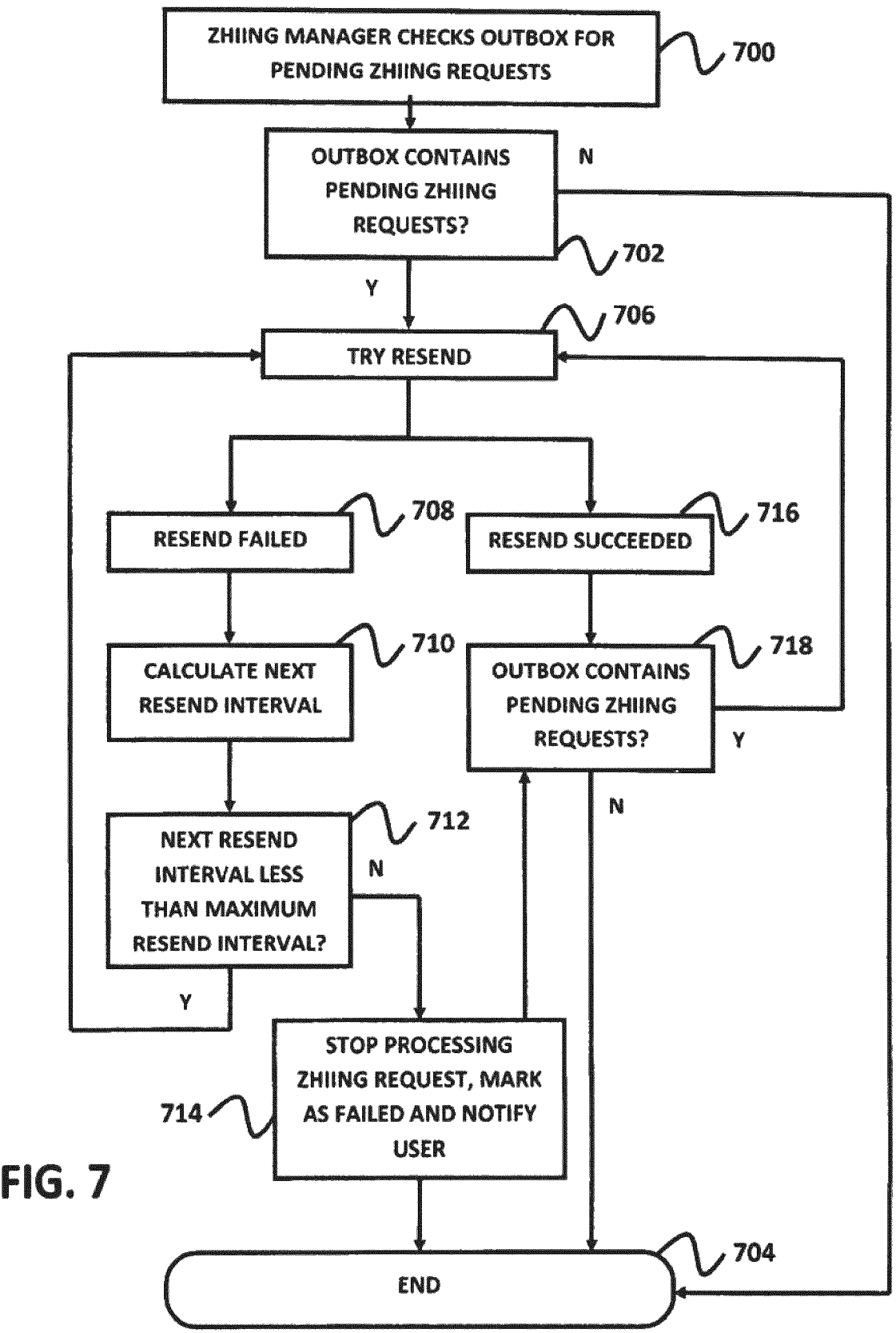
FIG. 7 is a flow diagram continuing the illustration of FIG. 6.

The retry process is illustrated in FIG. 7. The ZHIING manager will check the OUTBOX after some predetermined period of time looking for ZHIING requests that are still pending (the ZHIING request would have been sent to the SENT box if it was not pending), block 700. If there is no pending request, block 702, the retry process terminates, block 704. If a pending request is present, block 702, the ZHIING manager will attempt to resend it again, block 706. If the second attempt to send the request fails, block 708, the ZHIING manager will calculate a resend interval, block 710. If that resend interval is anything less than the maximum resend interval (which may be determined by the service provider network 112, the operating system of the sending device, or some other factors), the ZHIING manager will attempt to resend the ZHIING request again, block 712. If the resend interval has been or will be exceeded, then the ZHIING manager will stop processing the ZHIING request, mark the ZHIING request as failed, and notify the user accordingly, block 714. If the resend is successful at any point in the retry process, block 716, the ZHIING manager will move the ZHIING request to the SENT box and then check to see if there are any other pending requests in the OUTBOX, block 718.

Figure 8:
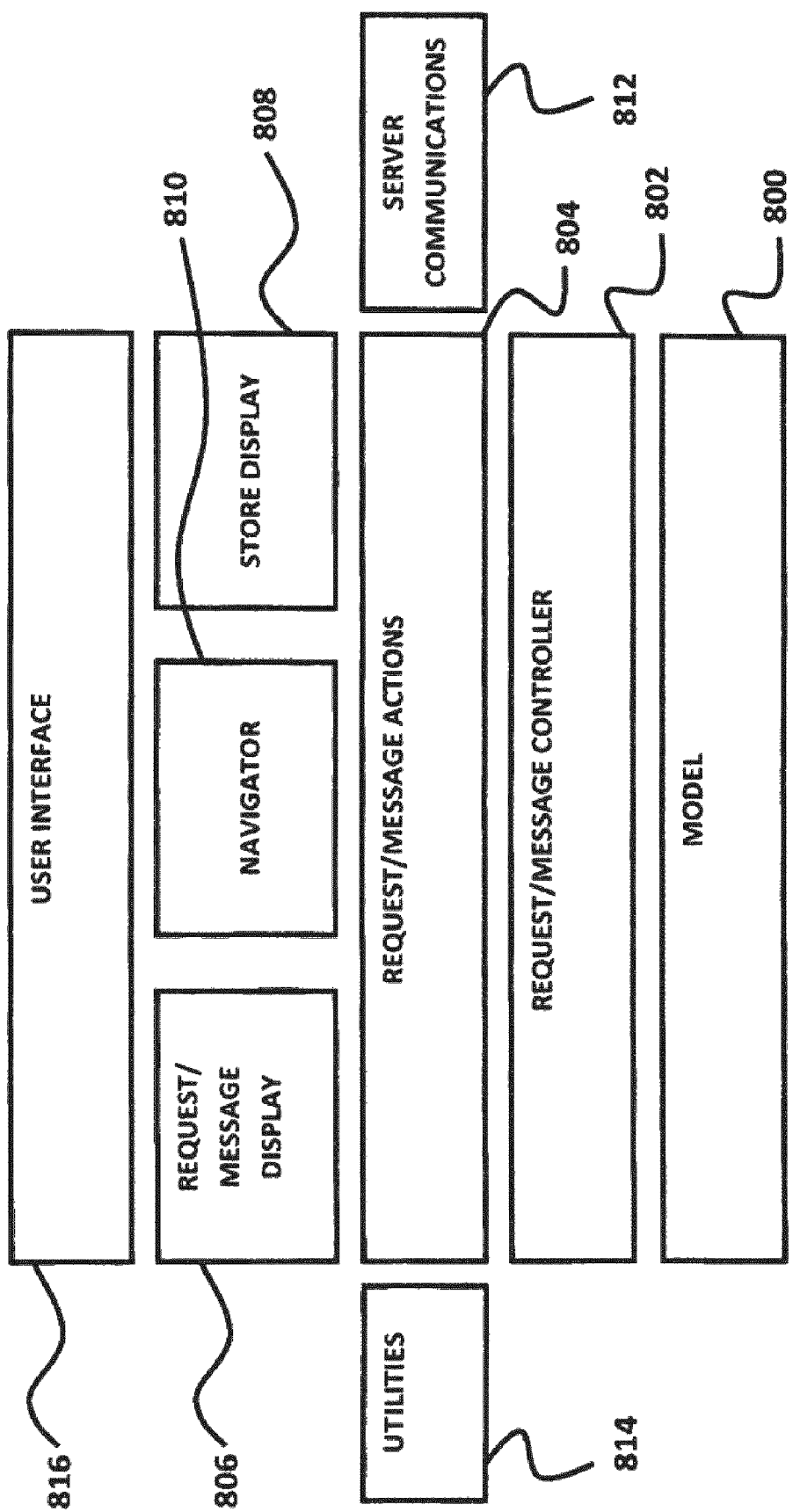
FIG. 8 illustrates a high level architecture of a ZHIING manager in accordance with the present invention.

An exemplary system architecture for a ZHIING manager, as implemented by various object oriented component modules within an APPLE IPHONE, is illustrated in FIG. 8. The model layer 800 includes the various classes (the characteristics and behaviors of different objects) that represent the ZHIING request/message and the request/message aggregator. The model controller layer 802 includes the class that would manage the request/message aggregators. Model controller 802 is also the entry point to the model 800. The request/message actions layer 804 contains the classes that would deal with the actions related to a request/message, such as send, forward, read, resend, and view map/directions. The request/message display layer 806 contains the set of classes that display the request/message and the options associated with it. The store display layer 808 displays the request message stores (i.e., INBOX, OUTBOX AND SENT box). The navigator layer 810 enables navigation between the different views (the main display, various message stores, dialogue box, etc.). The server communication layer 812 interfaces with the IPHONE's communication network and handles interaction with the ZHIING application server 106. The utilities layer 814 provides services that are utilized by the other component modules, such as converting a ZHIING message into XML format, finding the IPHONE's geographic location, or accessing the mapping application. The User Interface 816 enables user interaction with the ZHIING manager. In accordance with the present invention, the INBOX of the ZHIING manager lists all of the receiving ZHIING messages that have been saved by the user. ZHIING messages that have not been opened are indicated as being "unread". The SENT box lists all of the sent ZHIING requests that have been saved by the user. The OUTBOX lists all of the ZHIING messages that are in the process of being sent or could not be sent and are subject to retry or have failed. Within each box, the user has the ability to navigate through the different requests/messages, open requests/messages, and perform other functions, such as delete, resend, stop a resend, etc.

What is claimed is:

1. A method for receiving a set of location identifiers corresponding to a target address, comprising the steps of:
   receiving a message with a receiving device having a unique identifier, the message being sent to the receiving device by an application server after receiving from a sending device a request containing the target address and the unique identifier;
   identifying a location of the receiving device;
   responding to the message with the receiving device by sending a response to the application server requesting the set of location identifiers; and
   receiving the set of location identifiers from the application server with the receiving device in response to the response, the set of location identifiers enabling a user of the receiving device to be provided with a route from the location of the receiving device to the target address, wherein the message includes a prompt, wherein the step of receiving the message includes detecting the prompt, and wherein the step of receiving the message further includes intercepting the message from being processed as a standard message by the receiving device.

2. The method of claim 1, wherein the step of responding includes the step of automatically sending the response to the application server.

3. The method of claim 2, wherein the receiving device includes a software application for responding to the message and providing the route based on the set of location identifiers, and wherein the step of automatically sending includes the step of activating the software application in response to the prompt.

4. The method of claim 1, wherein the response is a HTTP request, and wherein the set of location identifiers is a HTTP response.

5. The method of claim 1, wherein the message is a text message including the prompt, and wherein the step of receiving the message further includes the step of intercepting the text message from being processed as a standard text message by the receiving device.

6. The method of claim 5, wherein the text message is a SMS message, and wherein the step of intercepting the text message includes placing the SMS message in an application queue for processing messages including the prompt instead of an SMS application queue for processing SMS messages.

7. The method of claim 1, wherein the message is an email message including the prompt, and wherein the step of receiving the message further includes intercepting the email message from being processed as a standard email message by the receiving device.

8. The method of claim 1, wherein the message is a URL, wherein the response is a HTTP request, and wherein the set of location identifiers is a HTTP response.

9. The method of claim 1, wherein the route is a route map highlighting a path from the location of the receiving device to the target address.

10. The method of claim 9, wherein the route map is sent to the receiving device as part of the set of location identifiers.

11. The method of claim 9, wherein the route map is developed by a mapping application installed on the receiving device in response to receiving the set of location identifiers.

12. The method of claim 1, wherein the route is a textual description of a route from the location of the receiving device to the target address.

13. The method of claim 12, wherein the textual description is sent to the receiving device as part of the set of location identifiers.

14. The method of claim 12, wherein the response includes the location of the receiving device, wherein the textual description is a set of turn by turn directions from the location of the receiving device to the target address, and wherein the set of turn by turn directions is a series of SMS messages with one turn per SMS message.

15. The method of claim 12, wherein the textual description is developed in response to receiving the set of location identifiers by a mapping application installed on the receiving device.

16. The method of claim 1, wherein the route is a verbal description of a route from the location of the receiving device to the target address.

17. The method of claim 1, further comprising the step of displaying additional content contained within the message to the user of the receiving device.

18. The method of claim 1, further comprising the step of storing a set of data associated with the message for future use.

19. The method of claim 1, further comprising the step of forwarding a set of data associated with the message to another device.

20. The method of claim 1, wherein the message indicates to the receiving device that an unretrieved data message containing the set of location identifiers is available for download to the receiving device from the application server.

21. The method of claim 1, wherein the route includes a route map highlighting a path from the location of the receiving device to the target address, wherein the route includes a textual description of the route from the location of the receiving device to the target address, and wherein the step of receiving the set of location identifiers includes the step of allowing the user to choose between the route map and the textual description.

22. The method of claim 1, wherein the receiving device is a location aware device.

23. The method of claim 22, wherein the location aware device is a mobile phone.

24. The method of claim 22, wherein the location aware device is a GPS navigation device.

25. The method of claim 1, further comprising the step of responding to the message by sending a request including the location of the receiving device to the application server so the application server can send the location of the receiving device to the sending device.

26. The method of claim 1, wherein the message includes marketing information, further comprising the step of displaying the marketing information to the user of the receiving device.

27. The method of claim 26, wherein the marketing information is based on at least one of the location of the receiving device and the route.

28. A method for receiving a geographic location corresponding to a target address, comprising the steps of:
receiving a message with a receiving device having a unique identifier, the application server sending the message to the receiving device after the application server receives from a sending device a request containing the target address and the unique identifier;
identifying a geographic location of the receiving device;
responding to the message with the receiving device by sending a response to the application server requesting the geographic location corresponding to the target address; and
receiving the geographic location corresponding to the target address from the application server with the receiving device in response to the response, the geographic location corresponding to the target address enabling the receiving device to provide a route from the geographic location of the receiving device to the geographic location corresponding to the target address, wherein the message includes a prompt, wherein the step of receiving the message includes detecting the prompt, wherein the receiving device includes a software application for responding to the message and providing the route, and wherein the step of responding sending includes the step of activating the software application in response to the prompt.

29. The method of claim 28, wherein the step of responding includes the step of automatically sending the response to the application server.

30. The method of claim 28, further comprising the step of displaying the route to a user of the receiving device.

31. The method of claim 28, wherein the response is a HTTP request, and wherein the set of location identifiers is a HTTP response.

32. The method of claim 28, wherein the message is a text message including the prompt, and wherein the step of receiving the message further includes intercepting the text message from being processed as a standard text message by the receiving device.

33. The method of claim 28, wherein the message is an email message including the prompt, and wherein the step of receiving the message further includes intercepting the email message from being processed as a standard email message by the receiving device.

34. The method of claim 28, wherein the message is a URL, wherein the response is a HTTP request, and wherein the geographic location corresponding to the target address is sent by the application server as a HTTP response.

35. The method of claim 28, wherein the route is a route map highlighting a path from the geographic location of the receiving device to the geographic location corresponding to the target address.

36. The method of claim 35, wherein the route map is developed in response to receipt of the geographic location corresponding to the target address by a mapping application installed on the receiving device.

37. The method of claim 28, further comprising the step of displaying additional content contained with the message to a user of the receiving device.

38. The method of claim 28, wherein the message indicates to the receiving device that an unretrieved data message containing the geographic location corresponding to the target address is available for download to the receiving device from the application server.

39. The method of claim 28, wherein the receiving device is a location aware device.

40. The method of claim 39, wherein the location aware device is a mobile phone.

41. The method of claim 39, wherein the location aware device is a GPS navigation device.

42. The method of claim 28, further comprising the step of storing a set of data associated with the message for future use.

43. The method of claim 28, further comprising the step of forwarding a set of data associated with the message to another device.

44. The method of claim 28, further comprising the step of responding to the message by sending a request including the geographic location of the receiving device to the application server so the application server can send the geographic location of the receiving device to the sending device.

45. The method of claim 28, wherein the message includes marketing information, further comprising the step of displaying the marketing information to a user of the receiving device.

46. The method of claim 45, wherein the marketing information is based on at least one of the geographic location of the receiving device and the route.

* * * * *